Oct. 23, 1928.
T. B. THURMAN
1,688,673
AUTOMOBILE AWNING
Filed Dec. 31, 1926   2 Sheets-Sheet 2
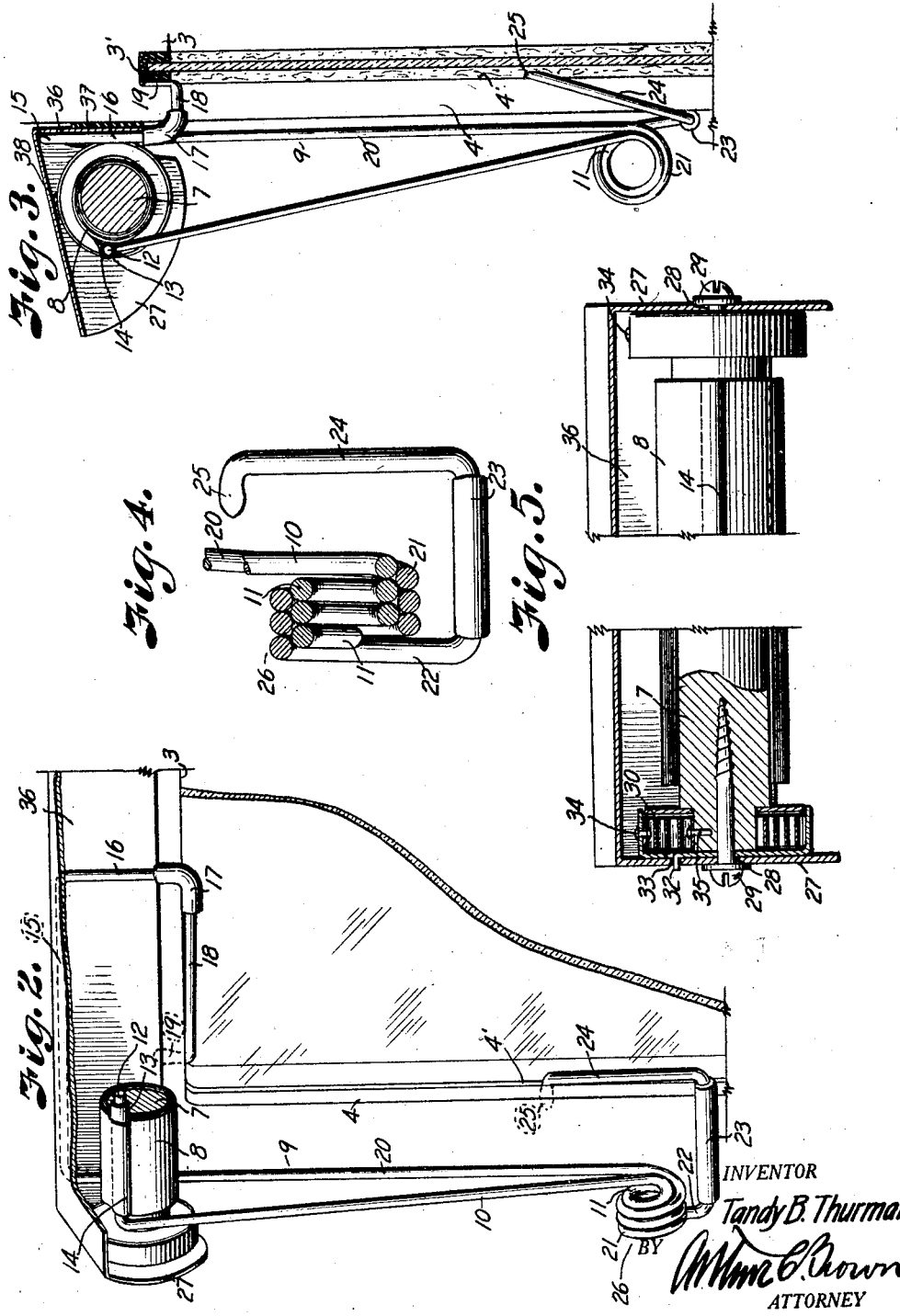
INVENTOR
Tandy B. Thurman.
BY
ATTORNEY Patented Oct. 23, 1928.

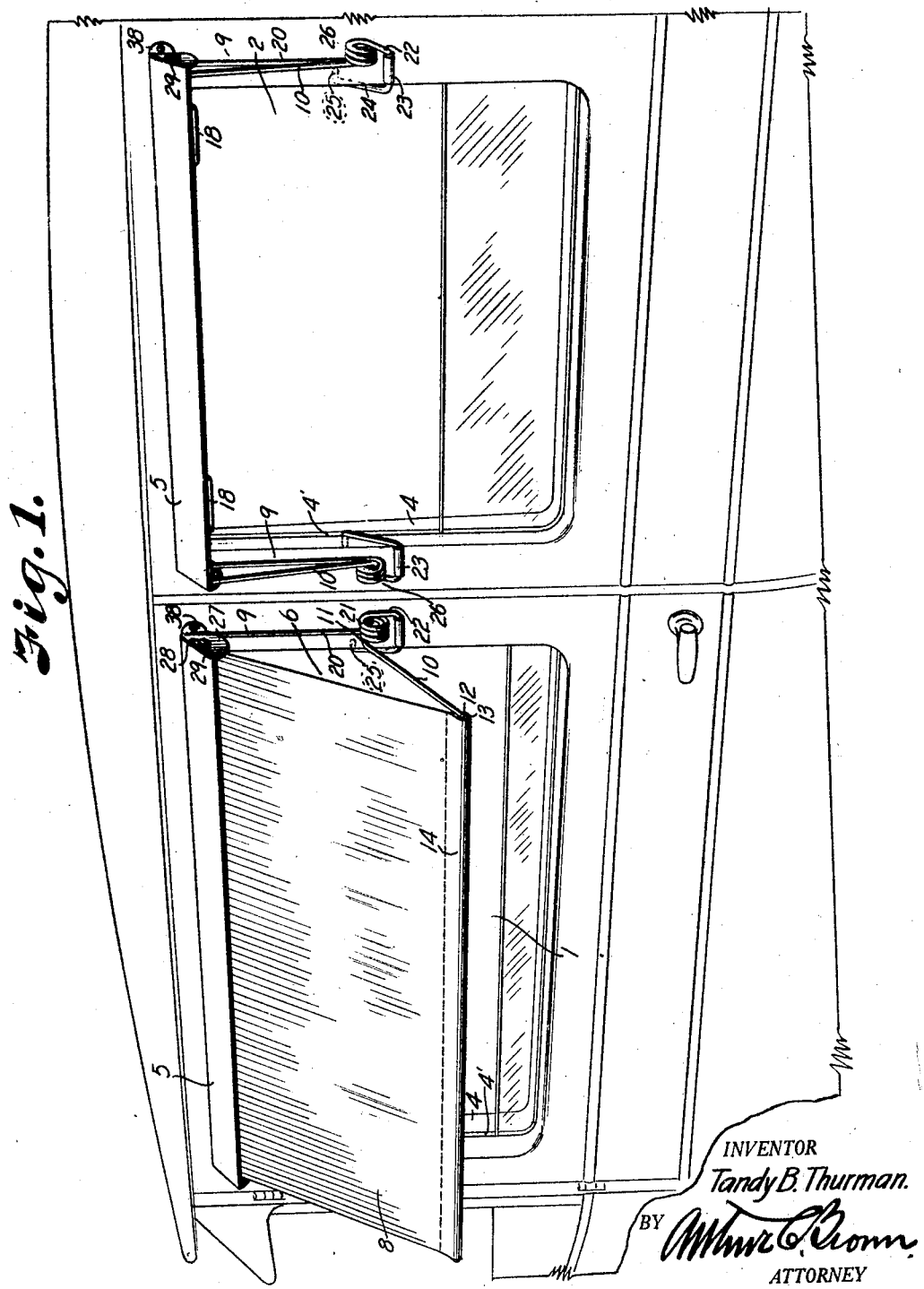

1,688,673

UNITED STATES PATENT OFFICE.

TANDY B. THURMAN, OF KANSAS CITY, MISSOURI.

AUTOMOBILE AWNING.

Application filed December 31, 1926. Serial No. 158,252.

My invention relates to awnings and more particularly to awnings for closed automobiles.

My purpose is to provide an awning frame that can be easily and securely installed in the window of an automobile whether the window is raised or lowered, to which a web-roller element and a visor element may be applied effectively, and having features whereby the web element of the awning is readily adjusted to and retained in desired position.

I accomplish my object by producing paired frame members one for each side of the window casing, constructed of pieces of wire so bent as to engage the casing and the awning web and visor elements and having friction and spring qualities whereby they are enabled to fulfill their functions in an especially novel and effective manner.

The structure of my awning and the services of its novel features will be particularly described with references to the accompanying drawings, in which:

Fig. 1 is a perspective view of my awnings installed in two adjacent windows of an automobile.

Fig. 2 is a perspective view of a frame member installed, associated web and visor elements shown fragmentarily.

Fig. 3 is an end view of the same.

Fig. 4 is a cross sectional view of a hinge member.

Fig. 5 is a sectional view of a shade roller, as applied to a visor element of my invention.

Referring more in detail to the drawings:

1 and 2 designate adjacent windows of a closed automobile, 3 the lintel or upper facing of the window casing and 3' the lintel groove therein, 4 the facing of a side casing and 4' the groove therein, 5 a visor or shield, and 6 awnings embodying my invention attached to the casing, the awnings being respectively shown in open position on window 1 and in retracted or closed position on window 2.

I provide a particular novelty in my means of attaching the awning roller 7 and its web 8 to the window casing, the means comprising a casing member 9 that is engaged with the window and supports the visor with the roller, and a projection member 10 one end 11 of which is coiled and hingedly engaged with the casing member as will be described and the other end is bent to provide the arm 12 insertable in the tubular rod 13 for the support of the projectible edge 14 of the web 8 secured to said rod, details of which various references will be more fully described.

The casing member 9 is formed from a wire provided with a bearing arm 15 designed to rest against the lintel parallel with the window opening, downbent into a bearing part 16 carrying a protective collar 17 of rubber or the like and having an arm retractedly bent substantially parallel with the arm 15 and designated 18. Upward from the arm 18 is projected a finger 19 for engagement in the lintel groove 3' of the window casing for anchoring the casing member 9. The casing member 9 comprises further an arm 20 having on its lower extremity a coil 21 laterally extended oppositely to the said bearing arm 15, the rounds of the coil terminating in a downward extension 22 that is inwardly bent and provided with a rubber or similar collar 23, the member being bent upwardly to provide a tension arm 24 having a laterally projected finger 25 designed for engagement in a side groove 4' of the window casing. The collared bent portion 23 is seated against the side wall 4 of the casing and co-operates with the finger 25 to retain the casing member 9 in engagement with the casing, tensioned by the engagement of the upper arms as confined by the finger 19 to the casing. The coil 11 of the projection member 10 fits within the coil 21 of the fixed casing member to provide a hinge. The casing and projection members above described are duplicated on opposite sides of the window opening so that the paired projection members may carry the ends of the rod 13 on the free edge of the awning web.

The frame as described may be installed in the grooves of a window casing and the projection members attached as shown to the outer edge of the web by means of the tubular rod. The roller 7 may be secured on the window casing by any suitable means. However, I offer as part of my invention the means of associating the awning with the window casing and with the visor 5, a visor being desirable for the protection of the retracted awning, and the association of which with an awning structure has not heretofore been widely practiced. I prefer to provide a visor manufactured for installation in connection with an awning and my frame having ears 27 provided with apertures 28 through which screws or escutcheon pins 29 are projected into the said roller securing the visor to the awning roller. The screws constitute the spindles, journalled in the apertures of the visor ears, on which the roller rotates.

My disclosure, further, particularly includes as factors of the association of roller and web with visor and casing a means of anchorage with the visor for the flat coil spring 30 on one end of the roller. A housing lug 32 outstruck from its body, the lug projecting through an aperture 33 in the adjacent ear 27 of the visor as the assembly is installed. The engagement of said lug with the visor in this manner provides the anchoring factor for the spring 30 upon tensioning of the spring by the rotation of the roller in process of unrolling the shade web by the actuation of said projection member 10, the spring being secured to the housing at 34 and to the roller interiorly by means of the escutcheon pin 35.

The said ears of the visor may be spaced from the ends of the roller as desired, to permit more or less freedom of movement by the roller, or to take up excess space between the roller spring housing and the ends of the roller.

I wish to call attention to my illustrated means of securing the visor in association with the casing and the awning frame, my description already having explained that the roller is secured in functioning position by engagement with the visor and the web edge with the frame. The depending backing portion 36 of the visor is inserted between the lintel and the bearing arm 15 of the casing member of the frame, and pads 37 attached to the said portion 36 of the visor are provided to protect the lintel from abrasion and to provide an additional adhesive factor for the retention of the visor in position. The construction is such that the tension of the bearing arm 15 against the lintel provides adequate restraint for securing the visor in position against the influence of projection of the web edge 14 outwardly.

My means of hinging the parts of the frame constitute an illustrated feature of my device but are specifically claimed in another application now pending.

I wish, however, to call attention to the manner in which the distinctive hinge mechanism contributes to the efficiency and convenience of my awning structure. The projection member 10 may easily be pivoted to a desired position; and it will be retained by the hinge in such position. Should the frictional relation of the coils vary from a desired relation, the degree of hinging friction may be increased or reduced. Frictional readjustment is accomplished by inwardly or outwardly twisting the arm 24 to the required plane ranging from parallel with arm 20 to the inwardly or outwardly produced angle necessary to cause desired compression of the coil 21 on the coil 11, by restricting the diameter of the coil 21, constricting it on coil 11, or by measurably releasing the coil 21 from the coil 11.

I have specifically described a particular adaptation of my idea, and I wish now to mention an example of variation thereof which I may use and which I wish it understood to be covered, as well as other obvious adaptations. I may provide a casing member of my frame having an inbent bearing arm, a downbent portion and an outbent arm corresponding to the element designated 18 in the drawings but projected further outwardly to engage the member 20; said outbent member having an inwardly projecting intermediate loop upwardly diverted to constitute a hook for projection into the lintel groove for retention of said casing member of the frame; in this case the side casing bearing being dispensed with and the spring member being designed to constitute the anchor as bearing against the side casing for the functioning of the device.

I may also provide means for attaching the visor directly to the casing as additional support of the visor carrying the awning roller, for example by screws through provided ears laterally or otherwise extended from the visor as shown in Fig. 1 and designated 38.

It is obvious that brackets may be provided on the casing member 9 for frictional engagement in a groove of the upper part of the side casing, a bracket to have inwardly projecting studs to engage through suitable means with the shade roller member; or the brackets having suitably protected apertures in which the usual pivoting and holding pins of a roller may be engaged.

I will construct the casing member of the awning frame, that having two bearing arms engages the window casing, of phosphor-bronze or like material having rust-resisting qualities and having also the qualities requisite for functioning as described.

What I claim and desire to secure by Letters Patent is:

1. In an awning of the character described a supporting member including inbent arms having fingers for seating in the lintel and side grooves of a window frame, a coil on said member, and a spreader member including a coil hingedly engaged with the coil on the supporting member and having a web engaging portion.

2. In an awning support, a bracket including integral body and arm portions adapted to bear against the side and lintel members of a window frame and having hooks for seating respectively in side and lintel grooves for mounting the bracket on the frame, and a spreader hingedly mounted on the bracket.

3. An awning of the character described including paired bracket members each including a body portion having an upper lateral arm engageable with a lintel, a projection on the arm adapted for extension into a window opening and an upturned finger on the projection engageable in a lintel groove, a lower arm on said body portion having a projection adapted for extension into the window opening and a finger on said projection engageable in the side groove of a window frame, means for supporting an awning web, and a spreader carried by said bracket members including means engageable with the awning web.

4. An awning including paired brackets each formed of spring wire including a body portion, a lower inwardly directed arm engageable with the side of a window frame and an upper arm engageable with a lintel, the arms having extensions bent to project into a window opening and provided with fingers for engaging in lintel and side grooves of the window frame, means for supporting an awning web, and a spreader carried by said brackets and connected with the web, the brackets including tensioning portions for retaining the brackets on the window frame.

5. An awning of the character described including spaced brackets, each including a vertical body portion adapted to lie along the side member of a window frame and having a lateral, rearwardly tensioned arm at its upper end provided with an extension adaptable for projection into a window opening and having an upturned finger for engaging in a lintel groove, a shield having a back member arranged rearwardly of said bracket arms to be held thereby against a lintel, a web roll carried by the shield, arms on said brackets having extensions adaptable for projection into a window opening and having fingers engageable in the side grooves of a window frame for anchoring the brackets, and a spreader carried by said brackets and connected with the awning web.

In testimony whereof I affix my signature.

TANDY B. THURMAN.